(12) United States Patent
Tanabe (10) Patent No.: US 12,520,901 B2
(45) Date of Patent: Jan. 13, 2026

(54) SHOE MEMBER AND SHOE (71) Applicant: ASICS CORPORATION, Kobe (JP)

(72) Inventor: Tatsuro Tanabe, Kobe (JP)

(73) Assignee: ASICS CORPORATION, Kobe (JP)

( * ) Notice: Subject to any disclaimer, the term of this patent is extended or adjusted under 35 U.S.C. 154(b) by 556 days.

(21) Appl. No.: 17/757,524

(22) PCT Filed: Dec. 25, 2019

(86) PCT No.: PCT/JP2019/050850
§ 371 (c)(1),
(2) Date: Jun. 16, 2022

(87) PCT Pub. No.: WO2021/130903
PCT Pub. Date: Jul. 1, 2021

(65) Prior Publication Data
US 2023/0000205 A1 Jan. 5, 2023

(51) Int. Cl.
A43B 13/04 (2006.01)
A43B 3/36 (2022.01)
A43B 13/18 (2006.01)

(52) U.S. Cl.
CPC .............. A43B 13/04 (2013.01); A43B 3/36 (2022.01); A43B 13/187 (2013.01)

(58) Field of Classification Search
None
See application file for complete search history.

(56) References Cited

U.S. PATENT DOCUMENTS

| 5,829,171 A * | 11/1998 | Weber ................ A43B 3/355 36/2.6 |
| 6,099,955 A | 8/2000 | Sakai et al. |
| 2014/0144050 A1* | 5/2014 | Smith, III ............ A43B 1/0072 36/137 |
| 2015/0181973 A1 | 7/2015 | Smith, III |
| 2017/0339773 A1 | 11/2017 | Chen |
| 2021/0401117 A1* | 12/2021 | Tanabe ................ B29C 44/42 |

FOREIGN PATENT DOCUMENTS

| CN | 108676242 A | | 10/2018 | |
| CN | 109679199 A | * | 4/2019 | ............ A43B 13/04 |
| JP | H05-065205 U | | 8/1993 | |
| JP | H09-241413 A | | 9/1997 | |
| JP | H09-302059 A | | 11/1997 | |
| JP | 2007159597 A | * | 6/2007 | |
| JP | 2008-013659 A | | 1/2008 | |
| WO | WO-2018142467 A1 | * | 8/2018 | |

OTHER PUBLICATIONS

Umezawa, I., Shoe, Jun. 28, 2007, machine translation of JP2007-159597 (Year: 2007).*
Liao, S., Coarse Composite Foaming Material, Apr. 26, 2019, machine translation of CN109679199 (Year: 2019).*
Yamade, T., Shoe Member and Shoe, Aug. 19, 2018, machine translation of WO2018/142467 (Year: 2018).*
International Search Report issued in PCT/JP2019/050850; mailed Mar. 17, 2020.

* cited by examiner

Primary Examiner — Chinessa T. Golden
(74) Attorney, Agent, or Firm — Studebaker Brackett PLLC (57) ABSTRACT A shoe member including a foam including a thermoplastic resin, wherein distribution of cell diameters of the foam in a part excluding a skin layer has at least two main dispersions.

9 Claims, 13 Drawing Sheets

EXAMPLE 1

EXAMPLE 2

COMPARATIVE EXAMPLE 1

COMPARATIVE EXAMPLE 2

SHOE MEMBER AND SHOE

TECHNICAL FIELD

The present invention relates to a shoe member and a shoe.

BACKGROUND ART

Foams having high light transmission properties are in demand as a material for shoe members used for a sole of shoes which emit light from a light source embedded therein as disclosed in Patent Literature 1 (Japanese Utility Model Laying-Open No. H5-65205), or as a material which improves design (appearance) of shoes.

In such cases, foams having a high proportion of foamed cells with a large diameter are considered to have high light transmission properties, but since the foamed cell with a large diameter is easily broken, the foam has the problem of poor durability (mechanical strength).

Patent Literature 2 (Japanese Patent Laying-Open No. H9-241413) discloses a soft synthetic resin foam applied to a sockliner of shoes and the like. A foamed cell with a large diameter (large pore) is produced in part of a foam by mixing powder of a plant. However, since the powder of a plant is mixed to the foam disclosed in Patent Literature 2 and the foam has a small proportion of cells with a large diameter, it is unlikely that the foam has high light transmission properties.

CITATION LIST

Patent Literature

PTL 1: Japanese Utility Model Laying-Open No. H5-65205
PTL 2: Japanese Patent Laying-Open No. H9-241413

SUMMARY OF INVENTION

Technical Problem

In view of the above problem, an object of the present invention is to provide a shoe member having both light transmission properties and durability.

Solution to Problem

A shoe member comprising a foam comprising a thermoplastic resin, wherein distribution of cell diameters of the foam in a part excluding a skin layer has at least two main dispersions.

Advantageous Effects of Invention

The present invention can provide a shoe member having both light transmission properties and durability without mixing a material which reduces light transmission properties of foam, such as powder, by using a foam including both a cell with a large diameter and a cell with a small diameter (bimodal foam) as a material of the shoe member.

DESCRIPTION OF EMBODIMENTS

The summary of embodiments of the present invention is as follows.

(1) A shoe member comprising a foam comprising a thermoplastic resin, wherein distribution of cell diameters of the foam in a part excluding a skin layer has at least two main dispersions.

(2) The shoe member according to (1), wherein in the distribution of cell diameters, the peak value of the maximum main dispersion is no less than 0.5 mm.

(3) The shoe member according to (1) or (2), wherein
in the distribution of cell diameters,
there are two main dispersions, and
the peak area of the maximum main dispersion is 20 to 60% of the total peak area.

(4) The shoe member according to any of (1) to (3), wherein the thermoplastic resin comprises EVA and at least one of OBC and a styrene elastomer.

(5) The shoe member according to any of (1) to (4), wherein
the foam further comprises a cross-linking agent, and
the content of the cross-linking agent is 0.1 to 0.8 parts by mass per 100 parts by mass of the thermoplastic resin.

(6) The shoe member according to any of (1) to (5), wherein the shoe member is transparent or semi-transparent.

(7) A shoe comprising the shoe member according to (6).

(8) The shoe according to (7), wherein the shoe member is used for a sole.

(9) The shoe according to (7) or (8), further comprising a light source.

(10) The shoe according to (9), further comprising a member that shields at least part of light emitted from the light source.

In the following, embodiments of the present invention will be described in detail with reference to figures. The same symbol is given to the same part or part in common in the figures and the description is not repeated.

<Shoe Member>

The shoe member of the present embodiment comprises a foam comprising a thermoplastic resin. Using the foam comprising a thermoplastic resin as a shoe member can give high shock absorbing performance to the shoe member.

(Foam)

Distribution of cell diameters of the foam in a part excluding a skin layer has at least two main dispersions.

As used herein, the skin layer includes a non-foam layer which has been preferentially cooled and solidified in the vicinity of the surface of the foam, and the skin layer has a degree of foaming significantly lower than that of the inside.

For the distribution of cell diameters, the area of the respective foamed cells in a cross-section of a sample of a foam in the direction perpendicular to the thickness direction is determined in image processing, and the equivalent circle diameter for the area is calculated and the distribution of cell diameters is determined from the results of calculation (see Table 2).

The probability in the distribution of cell diameters means the proportion of the diameter of cells (%) per sample when a histogram (frequency) is weighted with the diameter of cells and the sum of the histogram is taken as 100%.

The "main dispersion" has a clear peak in the above distribution of cell diameters with a distribution around the peak. For the total number of main dispersions in distribution of cell diameters, the number of main dispersions that meet the above condition of the main dispersion is counted.

A bimodal foam, the distribution of cell diameters of which has at least two main dispersions, provides a shoe member having both light transmission properties and durability.

(Distribution of Cell Diameters)

In the distribution of cell diameters, the peak value of "the maximum main dispersion" is preferably no less than 0.5 mm, and more preferably no less than 1 mm. As used herein, "the maximum main dispersion" in the distribution of cell diameters means a main dispersion with the largest cell diameter for the peak value out of the main dispersions. The presence of cells with a large diameter corresponding to the maximum main dispersion can improve light transmission properties of the foam (shoe member).

The peak value of the maximum main dispersion is preferably no more than 5 mm or less, and more preferably no more than 3 mm in order to maintain mechanical strength required for the shoe member.

By contrast, the peak value of main dispersions other than the maximum main dispersion is preferably less than 5 mm, and more preferably 0.1 to 0.3 mm.

When foam includes both cells with a large diameter corresponding to the maximum main dispersion and cells with a small diameter other than those, a foam (shoe member) having both light transmission properties and durability is obtained.

In the distribution of cell diameters, the ratio of an area (peak area) of the respective main dispersions is not particularly limited. For example, when there are two main dispersions, the ratio of the peak area of the maximum main dispersion to the total peak area (the total of the peak areas of the main dispersions) is preferably 20 to 60%, and more preferably 30 to 50%.

When the foam includes both cells with a large diameter corresponding to the maximum main dispersion and cells with a small diameter other than those at an appropriate ratio, a foam (shoe member) having both light transmission properties and durability is surely obtained.

When the cell with a large diameter has a larger diameter, the foam has higher light transmission properties. When the cell with a small diameter has a smaller diameter, the foam has higher durability (mechanical strength). Thus, a larger difference in the diameter between the cell with a large diameter and the cell with a small diameter makes the present invention more effective.

Furthermore, when the foam has cells with a large diameter of no less than 1 mm which can be visually observed and cells with a small diameter which cannot be visually observed around them, the foam assumes a unique appearance.

(Thermoplastic Resin)

The thermoplastic resin used in the present embodiment is not particularly limited. Examples thereof include ethylene vinyl acrylate (EVA), an olefin polymer, a styrene elastomer, an ethylene-vinyl acetate copolymer (EVA) and polyurethane (PU).

Examples of olefin polymers include polyethylene (e.g., linear low density polyethylene (LLDPE), high density polyethylene (HDPE)), polypropylene, an ethylene-propylene copolymer, a propylene-1-hexene copolymer, a propylene-4-methyl-1-pentene copolymer, a propylene-1-butene copolymer, an ethylene-1-hexene copolymer, an ethylene-4-methyl-pentene copolymer, an ethylene-1-butene copolymer, a 1-butene-1-hexene copolymer, a 1-butene-4-methyl-pentene copolymer, an ethylene-methacrylic acid copolymer, an ethylene-methyl methacrylate copolymer, an ethylene-ethyl methacrylate copolymer, an ethylene-butyl methacrylate copolymer, an ethylene-methyl acrylate copolymer, ethylene-ethyl acrylate copolymer, an ethylene-butyl acrylate copolymer, a propylene-methacrylic acid copolymer, a propylene-methyl methacrylate copolymer, a propylene-ethyl methacrylate copolymer, a propylene-butyl methacrylate copolymer, a propylene-methyl acrylate copolymer, a propylene-ethyl acrylate copolymer, a propylene-butyl acrylate copolymer, an ethylene-vinyl acetate copolymer (EVA) and a propylene-vinyl acetate copolymer.

The olefin copolymer is preferably an olefin block copolymer (OBC).

Examples of olefin block copolymers (OBCs) include "INFUSE" made by Dow Inc.

Examples of styrene elastomers include a styrene-isoprene-styrene copolymer (SIS), a styrene-butadiene-styrene copolymer (SBS), a styrene-ethylene-butylene-styrene copolymer (SEBS), a styrene-ethylene-butylene copolymer (SEB), a styrene-ethylene-propylene-styrene copolymer (SEPS), a styrene-isobutylene-styrene copolymer (SIBS), a styrene-butadiene-styrene-butadiene copolymer (SBSB) and a styrene-butadiene-styrene-butadiene-styrene copolymer (SBSBS). It is preferable that the styrene elastomer is at least one of SIS, SBS and SEBS.

It is preferable that in the present embodiment the thermoplastic resin comprises at least one selected from the group consisting of an ethylene vinyl acrylate (EVA), an olefin block copolymer (OBC) and a styrene elastomer.

It is more preferable that the thermoplastic resin comprises an ethylene vinyl acrylate (EVA) and at least one of an olefin block copolymer (OBC) and a styrene elastomer (e.g., SIS, SBS, SEBS).

In this case, of the raw materials of the foam, EVA and OBC (or a styrene elastomer) are in a separate phase. For examples, by setting the temperature in the step of foaming to a temperature lower than the crystal melting temperature of OBC (about 120° C.) and higher than the crystal melting temperature of EVA (about 80 to 90° C.), the melt viscosity of EVA becomes different from that of OBC, and low viscosity EVA forms a cell with a large diameter and high viscosity OBC forms a cell with a small diameter. This provides a foam having both a cell with a large diameter and a cell with a small diameter.

Theoretically, a foam having both a cell with a large diameter and a cell with a small diameter can be prepared even when a polyolefin elastomer (POE) is used instead of OBC or a styrene elastomer. However, OBC and a styrene elastomer in which regular crystal segments act as a pseudo cross-linking point have high melt viscosity at less than the melting point (crystal melting temperature), and thus are more likely to cause a difference in the cell diameter between EVA.

When the total amount of EVA and at least one of OBC and a styrene elastomer is 100 parts by mass in the raw materials of the foam, the amount of at least one of OBC and a styrene elastomer is preferably 10 to 50 parts by mass, and more preferably 20 to 40 parts by mass. In this case, a foam (shoe member) having both light transmission properties and durability is surely obtained.

The foam may also include a resin other than the thermosetting resin or rubber, a plasticizer, a reinforcing agent, a cross-linking agent and the like to the extent that the present invention is effective. In that case, the ratio of the thermoplastic resin is preferably 70 to 100% by mass, and more preferably 85 to 99% by mass based on the amount of the raw materials of the foam.

It is preferable that the (raw material of) foam includes a cross-linking agent. When a cross-linking agent is included, mechanical strength of the foam can be surely increased.

Examples of cross-linking agents include DCP (dicumyl peroxide) and BIPB (di-(tert-butylperoxyisopropyl)benzene).

The amount of the cross-linking agent added per 100 parts by mass of the thermoplastic resin is preferably 0.1 to 0.8 parts by mass (phr), and more preferably 0.2 to 0.6 phr. The amount of DCP (dicumyl peroxide) added is preferably 0.3 to 0.4 parts by mass per 100 parts by mass of the thermoplastic resin. The amount of BIPB (di-(tert-butylperoxyisopropyl)benzene) added is preferably 0.2 to 0.3 parts by mass per 100 parts by mass of the thermoplastic resin.

It is preferable that the shoe member (foam) is transparent or semi-transparent. This allows the foam to be used as a sole of shoes which emit light from a light source embedded, or improves design (appearance) of shoes.

(Method for Production)

Various known methods may be used as a method for producing the foam (shoe member).

The distribution of cell diameters of the foam (the proportion of cells with a large diameter) may be controlled by adjusting the rate of decompression (rate of foaming) when producing a foamed cell in the foam by physical foaming or chemical foaming. Usually low foaming rates increase the proportion of the cell with a large diameter (having a peak value of dispersion of no less than 0.5 mm).

It is preferable to use physical foaming for preparing the foam of the present embodiment because control of foaming rates is easier in physical foaming. However, the foam of the present embodiment can also be prepared by chemical foaming by controlling foaming rates (decompression rates).

<Shoes>

The present invention also relates to a shoe comprising the above shoe member.

The general structure of a shoe according to the present embodiment will be described with reference to FIG. 12 and FIG. 13.

Figure 12:
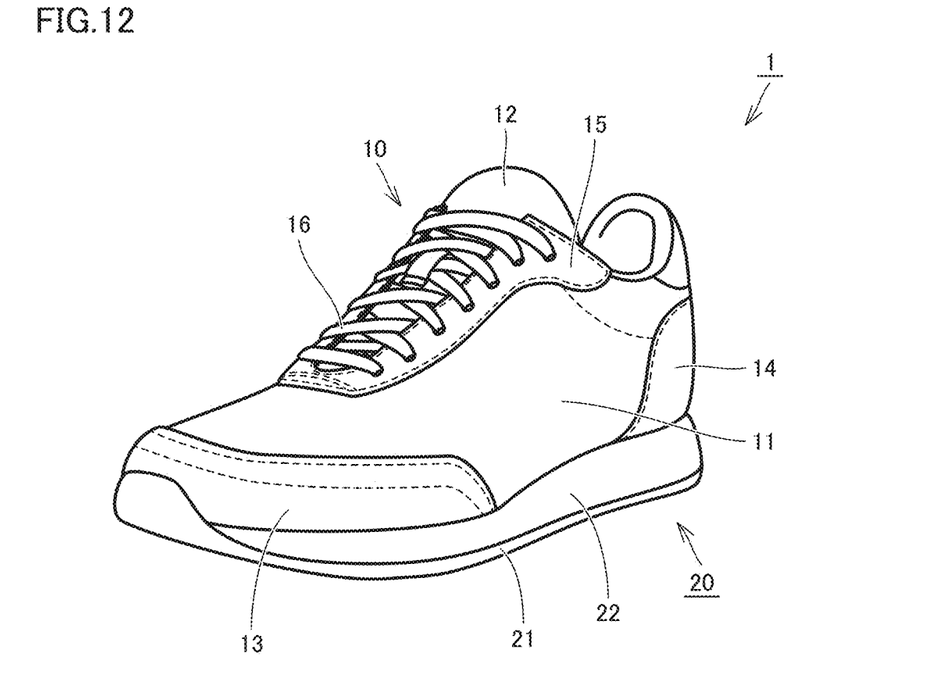
FIG. 12 is a perspective view illustrating a shoe comprising a shoe member according to an embodiment.

As shown in FIG. 12, a shoe 1 has an upper 10 and a sole 20. Upper 10 has a shape that covers the top of one's foot put therein. Sole 20 is located under upper 10 so as to cover the sole of the foot.

A sockliner may also be stored in upper 10 so that the sockliner covers the inner bottom of upper 10.

Upper 10 includes a main body of upper 11, a tongue of a shoe 12, a toe reinforcing part 13, a heel reinforcing part 14, an eyelet reinforcing part 15 and a shoelace 16. Of them, all of tongue of a shoe 12, toe reinforcing part 13, heel reinforcing part 14, eyelet reinforcing part 15 and shoelace 16 are fixed or attached to main body of upper 11.

A lower opening, which is covered with sole 20 is provided at the bottom of main body of upper 11. In another example, the lower end of main body of upper 11 is French seamed to form a bottom part (insole). In this case, to provide a bottom part at the bottom of main body of upper 11, the whole of main body of upper 11 may be previously formed into a bag by sock knitting or circular knitting instead of using French seam described above. An upper opening from which the upper ankle and part of the top of one's foot are exposed is provided at the upper portion of main body of upper 11. Tongue of a shoe 12 is fixed to main body of upper 11 by sewing, welding, bonding or by combining them so that tongue of a shoe 12 covers the portion, of the upper opening provided in main body of upper 11, from which part of the top of the foot is exposed. A woven fabric, a knitted fabric, synthetic leather, resin and the like are used for main body of upper 11 and tongue of a shoe 12, for example. A double raschel warp knitted fabric in which polyester yarn is knitted is used for shoes particularly requiring air permeability and light weight.

Toe reinforcing part 13 and heel reinforcing part 14 are provided in order to reinforce the portion covering the toe and the portion covering the heel in main body of upper 11, where durability is particularly required; they are located so as to cover the outer surface of those portions in main body of upper 11.

Eyelet reinforcing part 15 is provided in order to reinforce the periphery of the upper opening (where shoelace 16 is attached) provided in main body of upper 11 from which part of the top of the foot is exposed, where durability is particularly required as in toe reinforcing part 13 and heel reinforcing part 14. Eyelet reinforcing part 15 is located so as to cover the outer surface of that portion in main body of upper 11.

Toe reinforcing part 13, heel reinforcing part 14 and eyelet reinforcing part 15 are made of a woven fabric, a knitted fabric, leather, resin and the like fixed to the outer surface of main body of upper 11 by sewing, welding, bonding or by combining them. Toe reinforcing part 13, heel reinforcing part 14 and eyelet reinforcing part 15 are not an essential component, and part or all of them may be omitted.

Shoelace 16 is a member in the form of strings that lace up, in the direction of the width of the foot, peripheries of the upper opening provided in main body of upper 11, from which part of the top of the foot is exposed. Shoelace 16 is inserted in holes formed in the periphery of the upper opening. Tightening shoelace 16 with one's foot in main body of upper 11 allows main body of upper 11 to be closely attached to the foot. Shoelace 16 is not an essential component, either, and shoes may have a structure in which the main body of upper is closely attached to the foot with a hook-and-loop faster. Alternatively, shoes may have a structure in which main body of upper 11 is in the form of a sock without a tongue so that main body of upper 11 is closely attached to the foot only by inserting the foot into main body of upper 11.

An outsole 21 and a midsole 22 are integrated and shaped substantially flat as a whole. Outsole 21 has a contact surface 21b (see FIG. 13) at the bottom, and midsole 22 is located on outsole 21.

An insole 3 is attached to main body of upper 11 so that it covers the lower opening of main body of upper 11 described above. More specifically, insole 3 is fixed to the lower periphery of main body of upper 11 by sewing. Furthermore, insole 3 is fixed to the top surface of midsole 22 by bonding, welding and the like. Insole 3 is made of a woven fabric, a knitted fabric or a nonwoven fabric composed of a synthetic resin fiber such as polyester, or a resin foaming material including a resin material, which is the main component, and a foaming agent or cross-linking agent, which is a secondary component. Insole 3 may constitute part of sole 20 as described above, but is not essential, and shoes may not necessarily have insole 3.

A sockliner, which is not shown, is stored in upper 10 as described above, and detachably attached to the inner bottom of upper 10 or fixed to the inner bottom of upper 10 by welding, bonding and the like. The sockliner is made of a woven fabric, a knitted fabric or a nonwoven fabric composed of a synthetic resin fiber such as polyester, or a resin foaming material including a resin material, which is the main component, and a foaming agent or cross-linking agent, which is a secondary component. The sockliner is put therein for the purpose of improving touch on the foot. The sockliner is not an essential component, and may not be provided.

Figure 13:
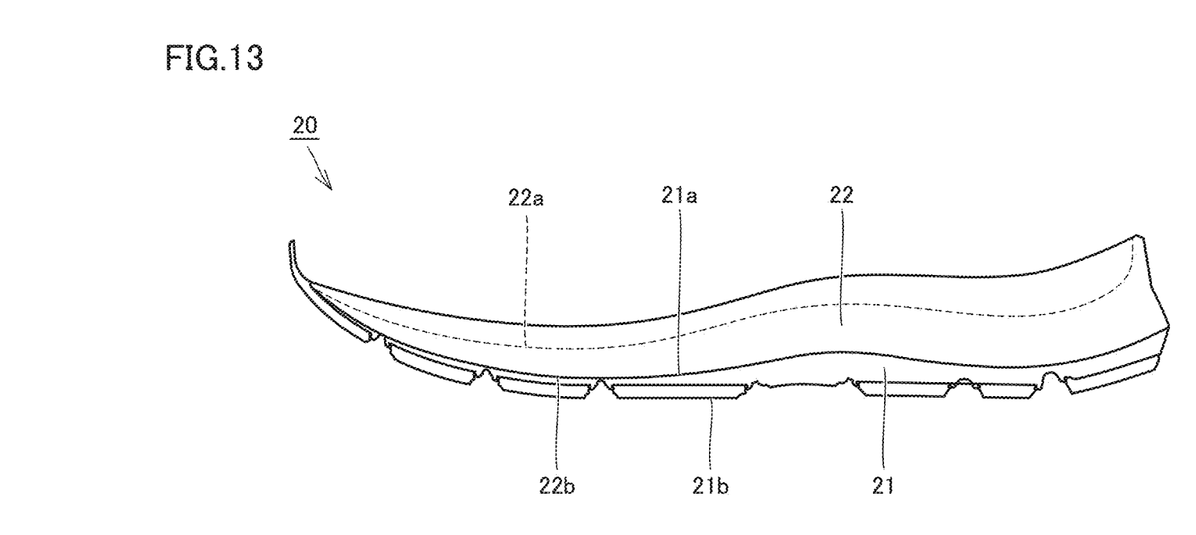
FIG. 13 is a side view of a sole of the shoe described in FIG. 12 viewed from the outside of the foot.

As shown in FIG. 13, sole 20 has outsole 21 and midsole 22 as described above. Outsole 21 has an upper surface 21a and a contact surface 21b, which is the lower surface, and constitutes the lower part of sole 20. Midsole 22 has an upper surface 22a and a lower surface 22b, and constitutes the upper part of sole 20.

Sole 20 has a shape in which the periphery of upper surface 22a of midsole 22 defining the upper surface thereof is raised higher than the surrounding, and thus upper surface 22a has a recessed portion. The recessed portion receives upper 10 and sockliner 3. Upper surface 22a excluding the above periphery, which is the bottom of the recessed portion, is smoothly curved so as to be fitted to the foot. Midsole 22 may be flat without the recessed portion.

It is preferable that outsole 21 has excellent wear resistance and grip properties. Thus, outsole 21 is usually made of a hard material having a Young's modulus larger than that of midsole 22. As shown in FIG. 13, irregularities may be formed on the exposed surface of contact surface 21b of outsole 21 to have a tread pattern in order to improve grip properties.

It is preferable that midsole 22 has appropriate strength and excellent shock absorbing properties. Midsole 22 is usually made of a soft material having a Young's modulus smaller than that of outsole 21.

It is preferable that the above shoe member is used, in particular, for a sole of shoes. The above shoe member having both light transmission properties and durability is useful as a sole of shoes which emit light from a light source embedded, and is useful for improving design of shoes.

It is preferable that the shoe further comprises a light source.

Figure 1:
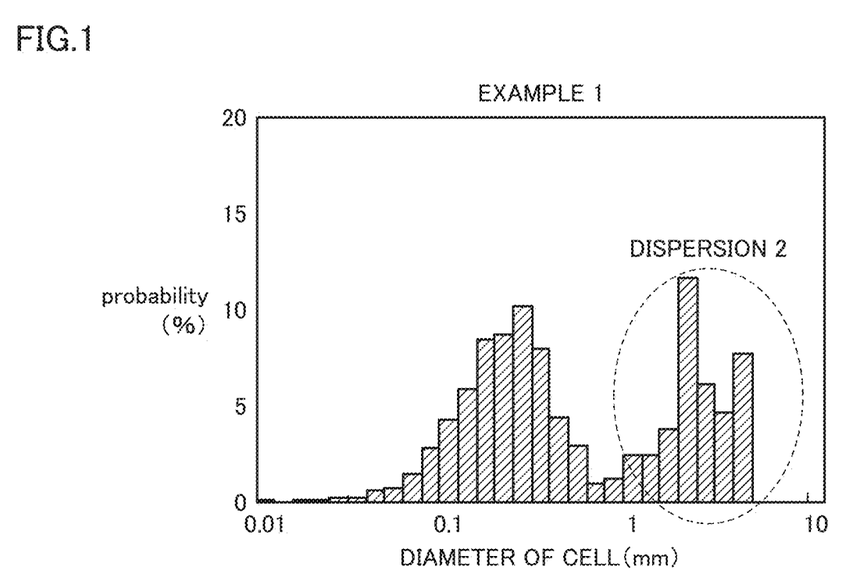
FIG. 1 is a graph showing distribution of cell diameters in the foam of Example 1.
Figure 2:
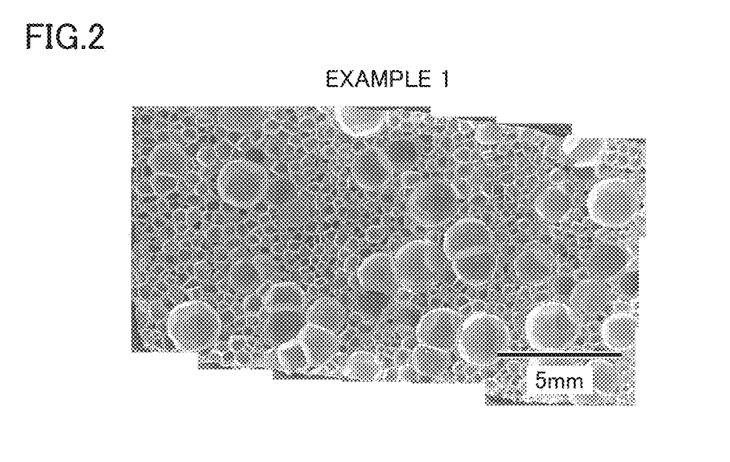
FIG. 2 is a scanning electron micrograph of a cross-section in the direction perpendicular to the thickness direction of the foam of Example 1.
Figure 3:
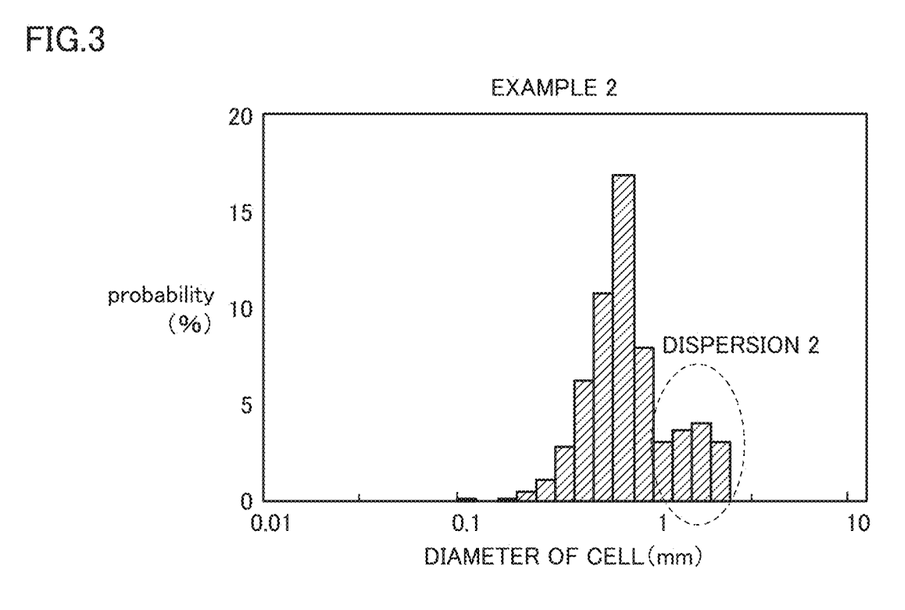
FIG. 3 is a graph showing distribution of cell diameters in the foam of Example 2.
Figure 4:
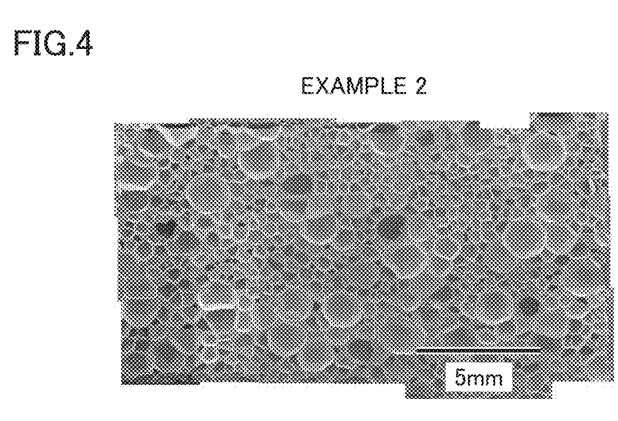
FIG. 4 is a scanning electron micrograph of a cross-section in the direction perpendicular to the thickness direction of the foam of Example 2.
Figure 5:
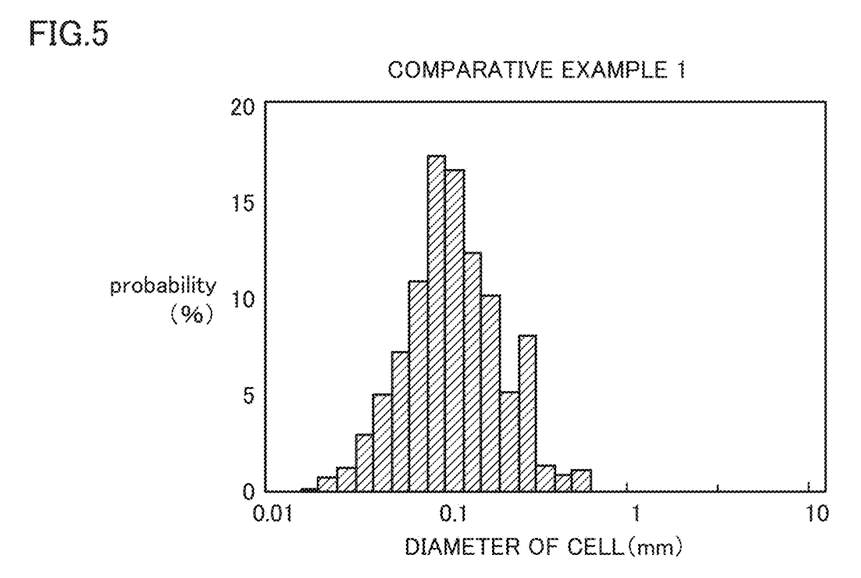
FIG. 5 is a graph showing distribution of cell diameters in the foam of Comparative Example 1.
Figure 6:
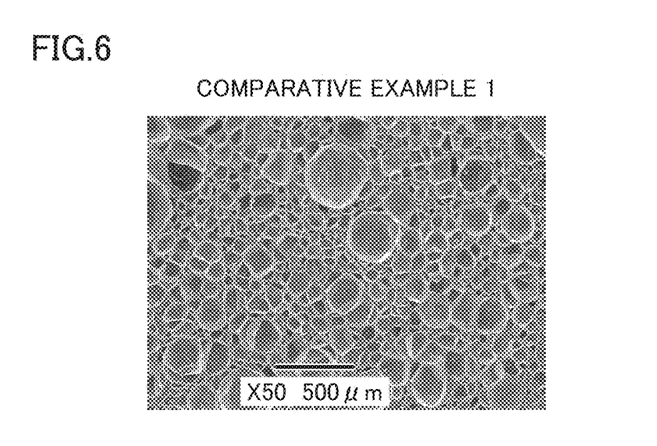
FIG. 6 is a scanning electron micrograph of a cross-section in the direction perpendicular to the thickness direction of the foam of Comparative Example 1.
Figure 7:
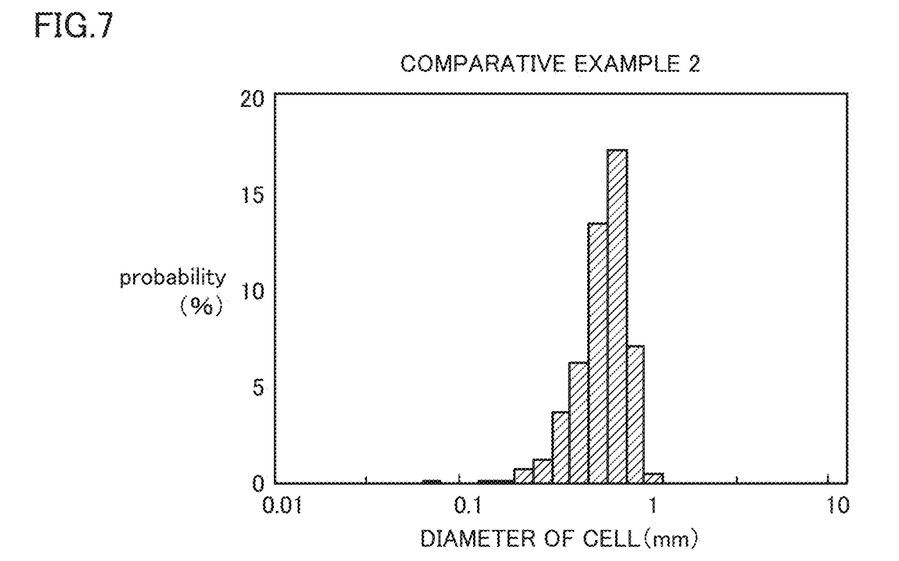
FIG. 7 is a graph showing distribution of cell diameters in the foam of Comparative Example 2.
Figure 8:
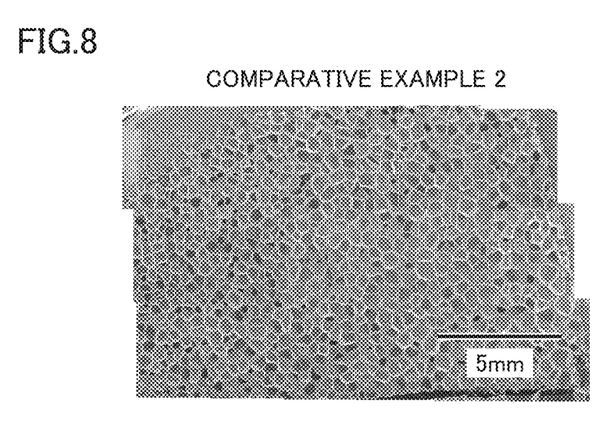
FIG. 8 is a scanning electron micrograph of a cross-section in the direction perpendicular to the thickness direction of the foam of Comparative Example 2.
Figure 9:
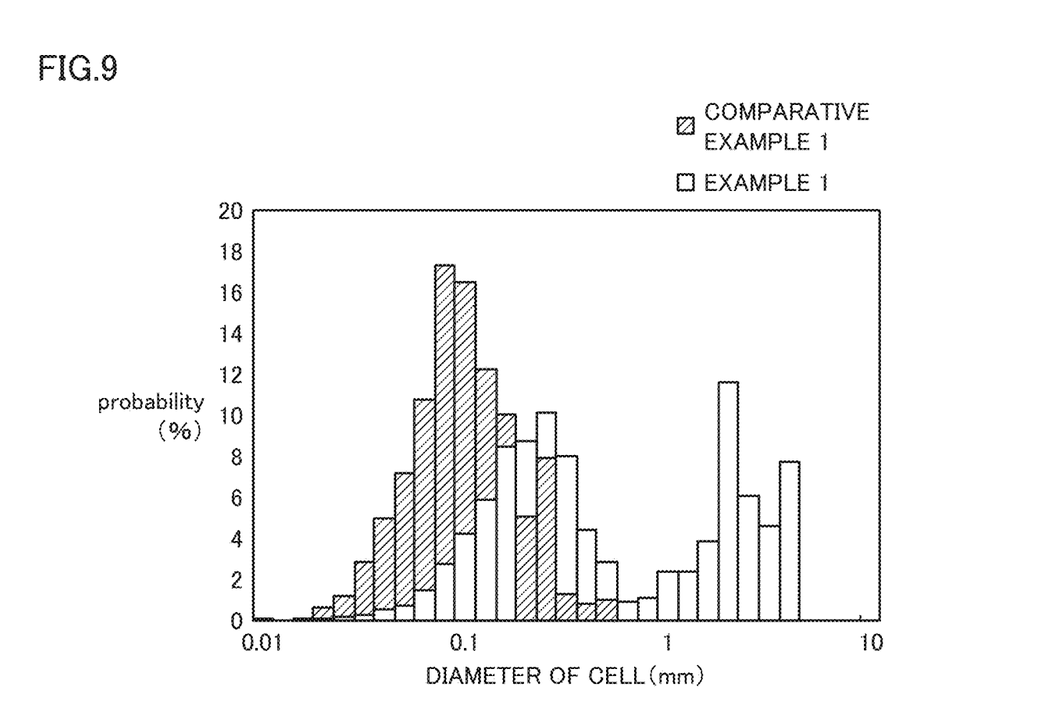
FIG. 9 is a graph showing distribution of cell diameters in the foam of Example 1 and Comparative Example 1.
Figure 10:
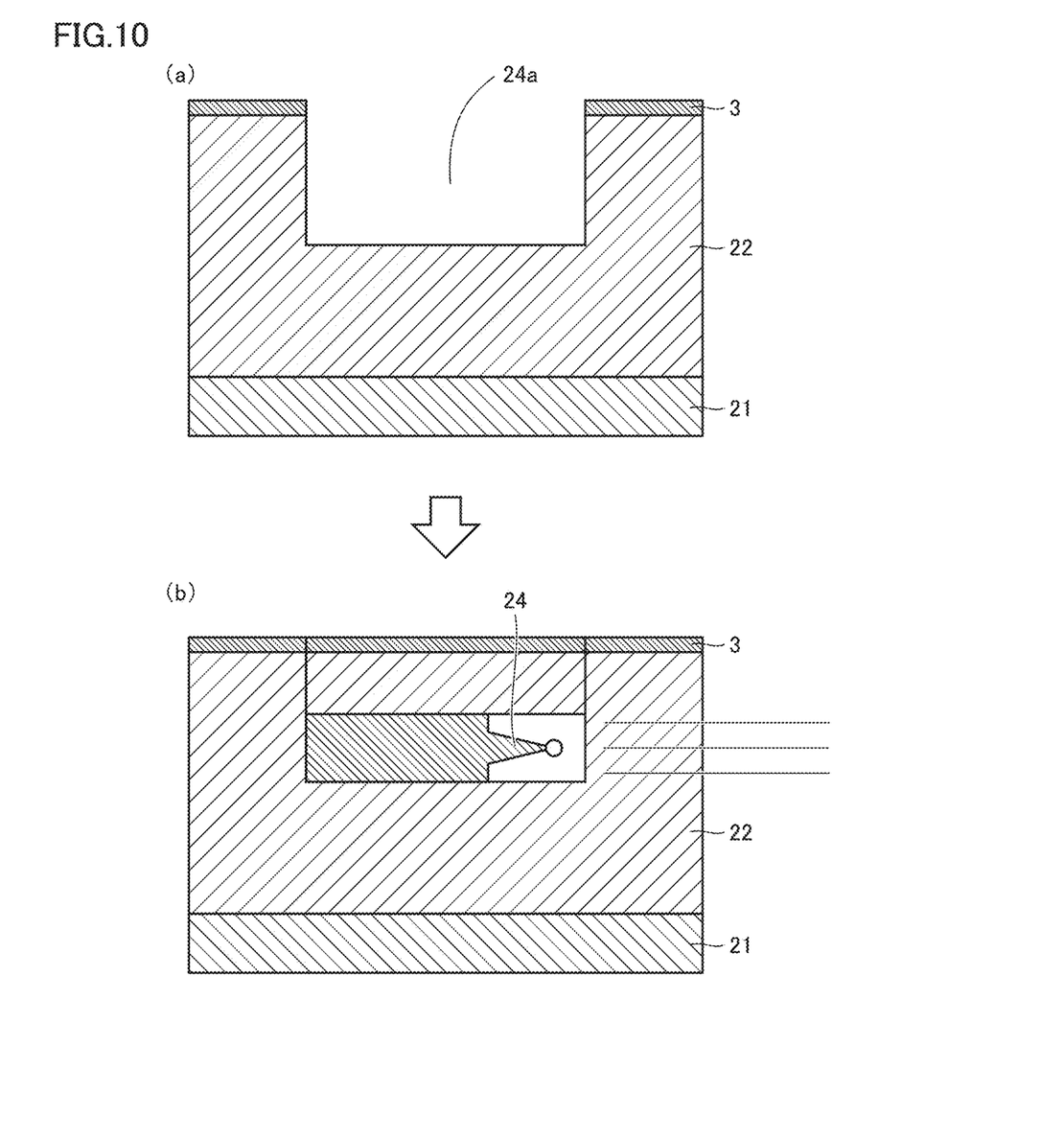
FIG. 10 is a schematic cross-sectional view illustrating a shoe having a light source.

For example, light source 24 is embedded in sole 20 (e.g., midsole 22) (FIG. 10(b)).

Examples of methods for producing such shoes include a method in which light source 24 is stored in a recess 24a formed in the position of insole 3 and midsole 22 made of foam and then the recess is closed with midsole 22 and insole 3 as described in FIG. 10(a). When shoes have a sockliner, a step formed by the closure is not in contact with the sole of the foot, and thus discomfort is less likely to occur.

A light source having any color or any brightness (e.g., LEDs) may be used as light source 24. It is preferable that light source 24 is exchangeably provided in shoes. Light source 24 is set at a position, for example, 10 mm to 35 mm away from the outer side of midsole 22 (the side in contact with outsole 21) toward the inner side (the side of sockliner 3).

Figure 11:
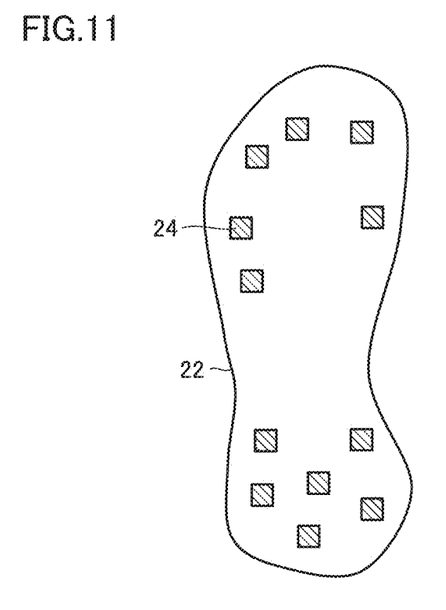
FIG. 11 is a plane view illustrating a shoe having a light source.

Shoes may have a plurality of light sources 24. Light sources 24 may be placed in any position in the entire midsole 22, and for example, may be arranged as described in FIG. 11. FIG. 11 is a perspective view of the shoe described in FIG. 12 from above.

As shown in FIG. 10 to FIG. 13, it is preferable that when sole 20 has outsole 21 and midsole 22, and light source 24 is set in midsole 22, the above foam (shoe member), which is a light transmitting material, is used for one or both of outsole 21 and midsole 22. The sole may be made of a single layer material, and the above foam may be used for such a sole.

It is preferable that when shoes have a light source as described above, the shoes further comprise a member that shield at least part of light emitted from the light source (shielding member). The shielding member is located, for example, in the midsole farther to the side or the bottom from the light source. When the shielding member has, for example, a notch of a predetermined shape, a pattern may be formed with light emitted to the outside of shoes.

EXAMPLES

Hereinafter, the present invention will be described in more detail by means of Examples, but the present invention is not limited thereto.

Example 1

A raw material containing a thermoplastic resin (a mixed resin of 80% by mass of EVA and 20% by mass of OBC) and a cross-linking agent (DCP: dicumyl peroxide) was prepared as shown in Table 1. The amount of the cross-linking agent mixed per 100 parts by mass of the thermoplastic resin was 0.3 parts by mass (0.3 phr).

A foam (shoe member) of Example 1 was prepared by cross-linking and physical foaming by using the above raw material. For cross-linking and physical foaming, a method in which a cross-linked thermoplastic resin was impregnated with gas of a foaming agent (supercritical fluid (SCF) gas) in an autoclave and the resin was allowed to foam by reducing pressure was used.

Example 2

A foam (shoe member) of Example 2 was prepared in the same manner as in Example 1 except for using s raw material having a composition of Example 2 shown in Table 1.

Comparative Example 1

A foam of Comparative Example 1 was prepared by cross-linking and chemical foaming by using a raw material having a composition of Comparative Example 1 shown in Table 1. For cross-linking and chemical foaming, a method in which a thermoplastic resin containing a cross-linking agent and a foaming agent was heated in press molding to perform crosslinking and foaming was used.

Comparative Example 2

A foam of Comparative Example 2 was prepared in the same manner as in Example 1 except for using a raw material having a composition of Comparative Example 2 shown in Table 1.

[Evaluation] (Distribution of Cell Diameters)

Distribution of cell diameters of samples of the foams of Examples and Comparative Examples was measured.

More specifically, for the respective samples of the foams of Examples and Comparative Examples, the equivalent circle diameter for the area of the respective foamed cells in a cross-section in the direction perpendicular to the thickness direction was calculated, and the distribution of cell diameters was determined from the results of calculation of the equivalent circle diameter as shown in Table 2, Table 3, FIG. 1, FIG. 3, FIG. 5 and FIG. 7.

The probability means the proportion of the diameter of cells (%) per sample when a histogram (frequency) is weighted with the diameter of cells and the sum of the histogram is taken as 100%.

In Table 1, "Dispersion 2" means the maximum main dispersion in the distribution of cell diameters of the respective foams, and "Dispersion 1" means a dispersion other than that. Furthermore, "Peak value of dispersion 1" refers to the diameter of cells at the peak of dispersion 1. "Peak value of dispersion 2" refers to the diameter of cells at the peak of dispersion 2.

"Ratio of dispersion 2" means the ratio of the peak area of dispersion 2 (the maximum main dispersion) to the total peak area (the total of the peak areas of dispersion 1 and dispersion 2). The ratio is calculated by the following formula.

Ratio of dispersion 2(%)=[peak area of dispersion 2/(peak area of dispersion 1+peak area of dispersion 2)]×100

The specific gravity of the respective samples is also described in Table 1.

TABLE 2

| Example 1 | | Example 2 | |
|---|---|---|---|
| Diameter of cell (mm) | probability (%) | Diameter of cell (mm) | probability (%) |
| 0.010 | 0.019 | 0.010 | 0.0 |
| 0.013 | 0.0 | 0.013 | 0.0 |
| 0.016 | 0.054 | 0.016 | 0.0 |
| 0.020 | 0.15 | 0.020 | 0.0 |
| 0.025 | 0.18 | 0.025 | 0.0 |
| 0.032 | 0.29 | 0.032 | 0.0 |
| 0.040 | 0.60 | 0.040 | 0.0 |
| 0.050 | 0.76 | 0.050 | 0.0 |
| 0.063 | 1.5 | 0.063 | 0.0 |
| 0.079 | 2.8 | 0.079 | 0.0 |
| 0.10 | 4.2 | 0.10 | 0.015 |
| 0.13 | 5.87 | 0.13 | 0.0 |
| 0.16 | 8.47 | 0.16 | 0.10 |
| 0.20 | 8.73 | 0.20 | 0.48 |
| 0.25 | 10.13 | 0.25 | 1.1 |
| 0.32 | 7.99 | 0.32 | 2.8 |
| 0.40 | 4.45 | 0.40 | 6.2 |
| 0.50 | 2.92 | 0.50 | 11 |
| 0.63 | 0.92 | 0.63 | 17 |
| 0.79 | 1.2 | 0.79 | 7.9 |
| 1.0 | 2.4 | 1.0 | 3.0 |
| 1.3 | 2.4 | 1.3 | 3.6 |
| 1.6 | 3.9 | 1.6 | 4.1 |
| 2.0 | 12 | 2.0 | 3.0 |
| 2.5 | 6.1 | 2.5 | 0.0 |
| 3.2 | 4.6 | 3.2 | 0.0 |
| 4.0 | 7.7 | 4.0 | 0.0 |
| 5.0 | 0.0 | 5.0 | 0.0 |
| 6.3 | 0.0 | 6.3 | 0.0 |
| 7.9 | 0.0 | 7.9 | 0.0 |
| 10 | 0.0 | 10 | 0.0 |

TABLE 3

| Comparative Example 1 | | Comparative Example 2 | |
|---|---|---|---|
| Diameter of cell (mm) | probability (%) | Diameter of cell (mm) | probability (%) |
| 0.010 | 0.0 | 0.010 | 0.0 |
| 0.013 | 0.0 | 0.013 | 0.0 |
| 0.016 | 0.10 | 0.016 | 0.0 |
| 0.020 | 0.67 | 0.020 | 0.0 |
| 0.025 | 1.2 | 0.025 | 0.0 |

TABLE 1

| | Example 1 | Example 2 | Comparative Example 1 | Comparative Example 2 |
|---|---|---|---|---|
| Thermoplastic resin | EVA (80%) OBC (20%) | EVA (60%) OBC (40%) | EVA (80%) POE (20%) | EVA (100%) — |
| Amount of cross-linking agent | 0.3 phr | 0.6 phr | 0.6 phr | 0.3 phr |
| Method of foaming | Cross-linking and physical foaming using SCF | Cross-linking and physical foaming using SCF | Cross-linking and chemical foaming | Cross-linking and physical foaming using SCF |
| Specific gravity | 0.137 | 0.131 | 0.17 | 0.131 |
| Peak value of dispersion 1 | 0.25 mm | 0.63 mm | 0.079 mm | 0.63 mm |
| Peak value of dispersion 2 | 2.0 mm | 1.6 mm | — | — |
| Ratio of Dispersion 2 | 41% | 14% | — | — |

TABLE 3-continued

| Comparative Example 1 | | Comparative Example 2 | |
|---|---|---|---|
| Diameter of cell (mm) | probability (%) | Diameter of cell (mm) | probability (%) |
| 0.032 | 2.9 | 0.032 | 0.0 |
| 0.040 | 5.0 | 0.040 | 0.0 |
| 0.050 | 7.2 | 0.050 | 0.0 |
| 0.063 | 11 | 0.063 | 0.0074 |
| 0.079 | 17 | 0.079 | 0.0 |
| 0.10 | 17 | 0.10 | 0.0 |
| 0.13 | 12 | 0.13 | 0.029 |
| 0.16 | 10 | 0.16 | 0.13 |
| 0.20 | 5.1 | 0.20 | 0.70 |
| 0.25 | 8.0 | 0.25 | 1.2 |
| 0.32 | 1.3 | 0.32 | 3.7 |
| 0.40 | 0.84 | 0.40 | 6.2 |
| 0.50 | 1.1 | 0.50 | 13 |
| 0.63 | 0.0 | 0.63 | 17 |
| 0.79 | 0.0 | 0.79 | 7.0 |
| 1 | 0.0 | 1.0 | 0.47 |
| 1.3 | 0.0 | 1.3 | 0.0 |
| 1.6 | 0.0 | 1.6 | 0.0 |
| 2.0 | 0.0 | 2.0 | 0.0 |
| 2.5 | 0.0 | 2.5 | 0.0 |
| 3.2 | 0.0 | 3.2 | 0.0 |
| 4.0 | 0.0 | 4.0 | 0.0 |
| 5.0 | 0.0 | 5.0 | 0.0 |
| 6.3 | 0.0 | 6.3 | 0.0 |
| 7.9 | 0.0 | 7.9 | 0.0 |
| 10 | 0.0 | 10 | 0.0 |

As shown in Table 1 to Table 3 and FIG. 1 to FIG. 4, the foams of Examples 1 and 2, each of the distribution of cell diameters of which has two main dispersions, have both excellent light transmission properties and excellent durability (mechanical strength). In this context, excellent light transmission properties mean that, for example, the foam has a total luminous transmittance (JIS K 7375, thickness 2 mm) of no less than 40%. Furthermore, excellent mechanical strength means that the foam has a tensile strength (JIS K6301) of no less than 1.5 MPa.

In Example 2, there are two dispersions although the peak of dispersion 2 is smaller than that in Example 1. The presence of two main dispersions is identified in the distribution of cell diameters even with such a small peak of dispersion 2 because there is a clear peak diameter in the distribution of cell diameters. This shows that the foam has both excellent light transmission properties and excellent durability (mechanical strength).

By contrast, the foam of Comparative Example 1 has a single dispersion in the distribution of cell diameters (one main dispersion in the distribution of cell diameters), and thus has low light transmission properties.

The foam of Comparative Example 2 has a larger cell diameter and thus has higher light transmission properties than the foam of Comparative Example 1, but the foam has poor mechanical strength due to single dispersion in the distribution of cell diameter, and therefore does not have both light transmission properties and mechanical strength.

The above embodiments and Examples disclosed in the present description are illustrative in all aspects and not restrictive. The technical scope of the present invention is defined by the claims and all changes coming within the meaning and equivalency range of the claims are intended to be embraced therein.

Furthermore, the characteristic elements disclosed in the above embodiments and Examples can be combined with each other without departing from the spirit of the present invention.

REFERENCE SIGNS LIST

1 Shoe, 10 Upper, 11 Main body of upper, 12 Tongue of shoe, 13 Toe reinforcing part, 14 Heel reinforcing part, 15 Eyelet reinforcing part, 16 Shoelace, 20 Sole, 21 Outsole, 21a Upper surface, 21b Contact surface, 22 Midsole, 22a Upper surface, 22b Lower surface, 24 Light source, 24a Recess, 3 Sockliner.

The invention claimed is:

1. A shoe member comprising a foam comprising a thermoplastic resin, wherein
distribution of cell diameters of the foam in a single part of the foam excluding a skin layer has at least two main dispersions, and
in the distribution of cell diameters,
a peak value of a maximum main dispersion is no less than 0.5 mm,
there are two main dispersions, and
a peak area of the maximum main dispersion is 20 to 60% of a total peak area.

2. The shoe member according to claim 1, wherein the thermoplastic resin comprises ethylene vinyl acrylate (EVA) and at least one of an olefin block copolymer (OBC) and a styrene elastomer.

3. The shoe member according to claim 1, wherein
the foam further comprises a cross-linking agent, and
the content of the cross-linking agent is 0.1 to 0.8 parts by mass per 100 parts by mass of the thermoplastic resin.

4. The shoe member according to claim 1, wherein the shoe member is transparent or semi-transparent.

5. A shoe comprising the shoe member according to claim 4.

6. The shoe according to claim 5, wherein the shoe member is used for a sole.

7. The shoe according to claim 5, further comprising a light source.

8. The shoe according to claim 7, further comprising a member that shields at least part of light emitted from the light source.

9. A shoe member comprising a foam comprising a thermoplastic resin, the shoe member comprising a shoe sole, wherein
distribution of cell diameters of the foam in a part excluding a skin layer has at least two main dispersions, and
in the distribution of cell diameters,
a peak value of a maximum main dispersion is no less than 0.5 mm,
there are two main dispersions, and
a peak area of the maximum main dispersion is 20 to 60% of a total peak area.

* * * * *